United States Patent [19]

Buccellato et al.

[11] Patent Number: 4,615,460
[45] Date of Patent: Oct. 7, 1986

[54] ANTI-CONTAMINATION COVERS FOR STRUCTURE OPENINGS

[75] Inventors: Ronald I. Buccellato; Wayne T. Card; Duane M. Foote, all of San Diego; Cinda B. Lewis, Chula Vista; Peter A. Soland, San Diego; Brian J. Stevens, San Diego; Philip C. Widmann, San Diego, all of Calif.

[73] Assignee: General Dynamics Corporation/Convair Div., San Diego, Calif.

[21] Appl. No.: 770,040

[22] Filed: Aug. 28, 1985

[51] Int. Cl.$^4$ ............................................... B65D 39/00
[52] U.S. Cl. .................................. 220/307; 220/902; 220/DIG. 19
[58] Field of Search .................. 220/307, 902, DIG. 19

[56] References Cited

U.S. PATENT DOCUMENTS 3,684,123  8/1972  Bridges ............................ 220/902
4,334,632  6/1982  Watanabe ......................... 220/307

Primary Examiner—George T. Hall
Attorney, Agent, or Firm—John R. Duncan; H. F. Mohrlock

[57] ABSTRACT

A cover for openings in a partially assembled missile or aircraft structure to prevent entry of chips, oil or other debris during further machining or other manufacturing operations. The cover has a central elastically compressible plug section adapted to fit snugly in an opening and an outwardly extending flange around one end of the plug. When the plug portion is inserted into the opening, the flange covers a ring of bolt holes surrounding the opening. The plug is formed from an elastic closed cell foam material and preferably has a cross-section slightly larger than the opening so as to be compressed slightly when inserted in the opening. The cover is coated with an elastomeric polyurethane coating to prevent flaking of the foam plug when inserted and removed from the opening and to prevent adhesion of contaminates to the cover. Because of the compressibility of the plug, each cover can be used with similarly configured openings of slightly varying sizes.

5 Claims, 4 Drawing Figures

ANTI-CONTAMINATION COVERS FOR STRUCTURE OPENINGS

BACKGROUND OF THE INVENTION

This invention relates in general to means for prevention of contamination of structures during manufacturing and, more specifically, to covers for openings in complex structures such as missiles and aircraft to prevent entry of contaminants during further machining or other manufacturing operations.

In the manufacture of aircraft, missiles and other complex structures, it is often necessary to partially assemble the structure, perform machining steps, then continue with assembly and installation of parts. Access to compartments, such as fuel tanks, is provided by openings which eventually are covered by plate-like covers, secured by a ring of bolts around the edge of the opening. These openings are not covered during assembly and machining, since access is needed from time to time and periodically removing and reinstalling the ring of bolts is time consuming and can lead to bolt hole thread damage.

If these compartment openings are left open during the assembly and machining operations, contaminants such as water, oil, metal chips or filings or the like will enter the compartments. These contaminants must be very thoroughly cleaned from the compartments prior to use of the finished structure, especially where the compartment contains electronics components or fuel. Perfect cleaning of these compartments, if highly contaminated, is very difficult in a fully assembled, very complex, structure.

In the past, such openings were covered by taping brown kraft paper over them. Cutting paper covers to shape and the manual taping operation are labor intensive and thus costly. Tape will sometimes not adhere to slightly oily surfaces and the paper will sometimes tear, permitting access of contaminants. Removing and reinstalling such paper covers each time access to a compartment was needed is time consuming and inefficient.

Solid rubber or plastic plugs have been used to close openings, especially in electrical connectors or the like. These are not useful in non-standard sized or shaped openings and tend to be loose and prone to falling out if the structure is inverted.

Attempts have been made to force soft foam balls, such as the popular "Nerf" balls into such openings. While such plugs are adaptable to a variety of opening sizes and shapes, they have been found to flake or abrade off foam particles when inserted and removed from sharp-edged openings, with the resulting particles adding to the contamination problem. Also, plugs of this type do not protect the ring of bolt holes often present around an access opening from contamination.

Thus, there is a continuing need for improved temporary contamination preventing plugs for access openings in complex aerospace structures during manufacture and assembly operations.

SUMMARY OF THE INVENTION

The above problems, and others, are overcome by a cover for access openings which includes a central elastically compressible closed cell foam plug having a diameter slightly larger than the opening to be plugged and adapted to be pressed into the opening; an outwardly extending flange at one end of the plug which serves to cover the ring of bolt holes which often surrounds such access openings and also prevents the plug from being pushed entirely into the adjacent compartment through the access opening and a coating of an elastomeric material preferably a polyurethane.

BRIEF DESCRIPTION OF THE DRAWING

Details of the invention and of certain preferred embodiments thereof will be further understood upon reference to the drawing, wherein.

DETAILED DESCRIPTION OF THE INVENTION

Figure 1:
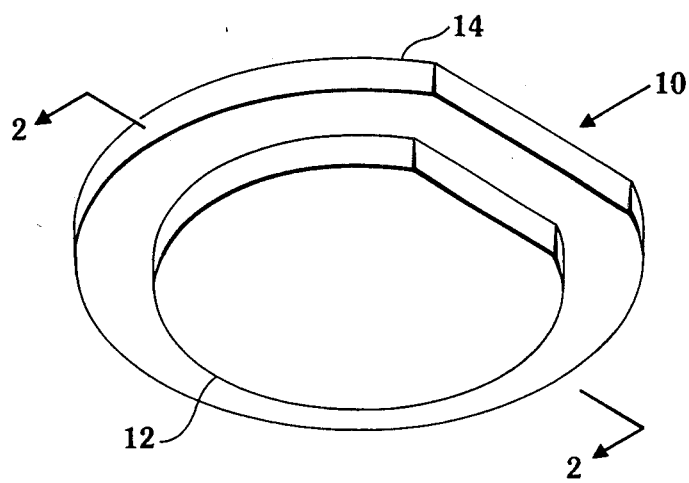
FIG. 1 is a perspective view of the protective cover of this invention.
Figure 2:
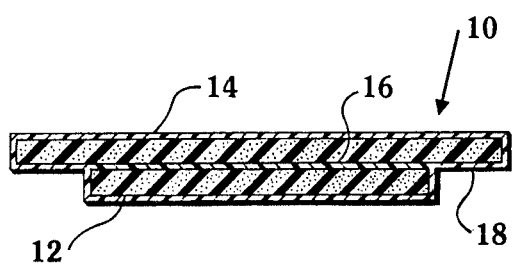
FIG. 2 is a vertical section through the cover of FIG. 1 taken on line 2—2 in FIG. 1.

Referring now to FIGS. 1 and 2, there is seen a protective cover 10 which includes a plug portion 12 and a flanged portion 14. In this embodiment, plug 12 and flanged portion 14 are each cut from a sheet of closed cell foam and then bonded together by an inter-layer 16 of a suitable adhesive. Typical adhesives include contact cement or spray adhesives such as Formica brand brushable contact adhesive #140. The cover assembly is uniformly coated with a thin layer 18 (somewhat exaggerated in thickness in FIG. 2 for clarity) of a suitable elastomeric material.

Any suitable closed cell foam may be used. Typical foams include silicone sponge rubber, polyurethane foam, and neoprene rubber. Of these neoprene rubber type II A soft, MIL-R-6130 is preferred because of its density and ability to resist absorbing the elastomeric coating.

The foam material may have any suitable density and other physical characteristics. Preferably, a fairly stiff foam, having a density in the range of from durometer 35 to 55 with a tensile strength of 1200 to 1500 psi is preferred.

The cover may be coated by any appropriate method, such as brushing, spraying, dipping or the like with a suitable elastomeric coating material which protects the foam surface and is resistant to flaking or chipping as the cover plug 12 is inserted into and removed from openings. Typical coating materials include anodize stopoff coating, elastomeric polyurethane, vinyl latex or any suitable combinations thereof. Of these, elastomeric polyurethane is preferred.

Plug portion 12 preferably has a cross-section similar to that of the opening with which it is to be used. For best results, the diameter of plug 12 is from about 1/16" to ¼" greater than that of the opening, so that the plug may be easily compressed and inserted into the opening and the elasticity of the foam is sufficient to firmly hold the cover in place. Larger openings, of course, tend to have larger tolerances.

Flanged portion 14 also has a plan appearance generally similar to that of the opening, but has the flange extending approximately 1 inch beyond the plug. Most access openings ultimately are closed after the structure is complete with a plate held to the structure by a plurality of bolts extending into holes along a line about ½ inch from the opening. Flange 14 thus covers that ring of holes and prevents contamination of those holes.

Figure 3:
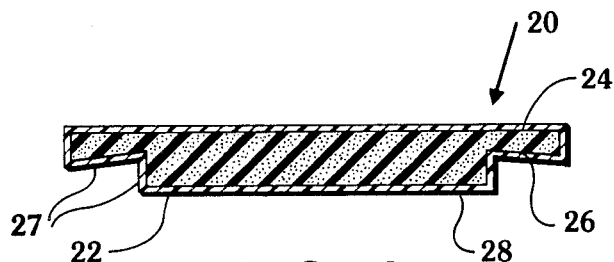
FIG. 3 is a vertical section through an alternate embodiment of the cover, taken on a line corresponding to line 2—2 in FIG. 1.

An alternate embodiment of cover 20 is illustrated in section in FIG. 3. The overall configuration of this embodiment is as shown in FIG. 1. In this case, both plug portion 22 and flanged portion 24 are formed as a unitary structure, such as by producing the closed cell foam in a mold. This is advantageous where a number of covers having the same dimensions are to be fabricated. The laminated structure of FIG. 2 is preferred where single or a small number of specifically sized covers are needed.

As seen in FIG. 3, the flanged portion 24 can be undercut slightly as seen at 26. When plug portion 22 is pressed tightly into an opening, the outer edge of undercut area 26 will press tightly against the surrounding surface, assuring protection of any ring of holes against outside contamination.

The angle 27 between the downwardly extending edge of plug 22 and the adjacent edge of flange 24 is preferably from about 60° to 80°.

After the cover 20 is removed from the mold, it is coated with an elastomeric protective coating as described above.

Figure 4:
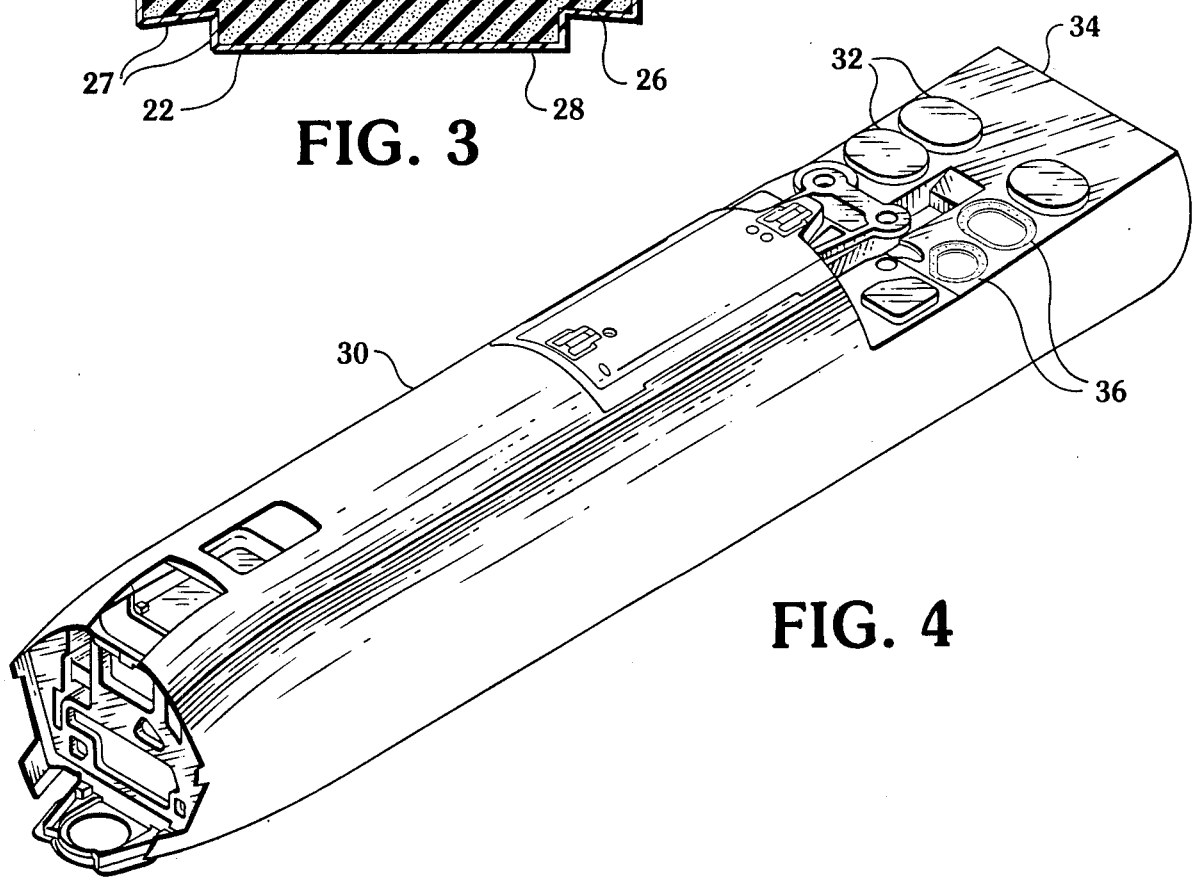
FIG. 4 is a perspective view of a partially assembled missile section with some protective covers in place.

FIG. 4 illustrates the use of a number of protective covers on a typical portion of a missile fuselage 30. Covers 32 of varying size and shape are in place in openings in the missile internal bulkhead 34, with their plug portions firmly seated in openings and flange portions snugly abutting the surfaces surrounding the openings. Openings 36 are uncovered, showing the ring of bolt holes 40 surrounding the openings. As can be seen, contamination such as dust, oil, metal particles from machining or the like cannot enter the covered openings during further machining or assembly of the missile.

Certain specific configurations, materials and relationships are detailed in the above description of preferred embodiments of this invention. These may be varied, as discussed above, where suitable, with similar results.

Other variations, applications and ramifications of this invention will occur to those skilled in the art upon reading this disclosure. Those are intended to be included within the scope of this invention, as defined in the appended claims.

We claim:

1. A cover for access holes in structures for prevention of contamination during further machining and assembly operations which comprises:
    a closed cell flexible foam plug member adapted to snugly fit a selected access hole, the plug having a cross-section area slightly greater than the hole area whereby the foam is compressed slightly when the plug is inserted into the hole so that the plug is elastically held in place;
    an outwardly extending flange adjacent to one end of said plug, whereby when the other end of said plug is inserted into said hole said flange covers any fastener holes adjacent to said hole;
    each of said plug member and said flange being a flat disk cut from a foam sheet which are bonded together with an elastomeric adhesive to form a unitary cover; and
    said plug and flange unitary cover being substantially uniformly coated with an elastomeric coating to prevent flaking of said foam during insertion and removal of said plug.

2. The cover according to claim 1 wherein said elastomeric coating is a polyurethane.

3. The cover according to claim 1 wherein said foam has a durometer density range of from about 35 to 55.

4. The cover according to claim 1 wherein the diameter of said plug member is from about 1/16" to ¼" greater than that of the opening with which the cover is to be used.

5. A method of making a cover for access holes in structures which comprises the steps of:
    cutting a plug member from a sheet of closed cell flexible foam material, said plug member having a configuration corresponding to that of the access hole to be covered and having a diameter from about 1/16" to ¼" greater than that of said access hole;
    cutting a flange member from a sheet of closed cell flexible foam material, said flange member having a configuration similar to that of said plug member but sufficiently larger to cover adjacent bolt holes when placed over said access hole;
    bonding said plug member to said flange member with an elastomeric adhesive so that said flange edges extend substantially uniformly beyond said plug member; and
    substantially uniformly coating said assembled plug and flange members with an elastomeric coating material which is resistant to flaking or particle abrasion when said plug member is inserted and removed from said access hole.

* * * * *